United States Patent [19]

Evangelou et al.

[11] Patent Number: 5,286,522
[45] Date of Patent: Feb. 15, 1994

[54] H₂O₂ INDUCED OXIDATION PROOF PHOSPHATE SURFACE COATING ON IRON SULFIDES

[75] Inventors: V. P. Evangelou; Xiao Huang, both of Lexington, Ky.

[73] Assignee: University of Kentucky Research Foundation, Lexington, Ky.

[21] Appl. No.: 979,649

[22] Filed: Nov. 19, 1992

[51] Int. Cl.⁵ .............................................. B05D 7/00
[52] U.S. Cl. ................................... 427/212; 427/215; 427/399
[58] Field of Search ........................ 427/215, 212, 399

[56] References Cited

U.S. PATENT DOCUMENTS

| | | | |
|---|---|---|---|
| 3,443,882 | 5/1969 | Flynn | 422/900 |
| 4,105,416 | 8/1978 | Burk, Jr. et al. | 44/624 |
| 4,158,548 | 6/1979 | Burk, Jr. et al. | 44/624 |
| 4,332,593 | 9/1982 | Burgess et al. | 44/626 |

OTHER PUBLICATIONS

Ahmed, S. M., Electrochemical and Surface Chemical Methods for Prevention of the Atmospheric Oxidation of Sulphide Tailings Sep. 16-18, 1991.
Meek, F. Allen, "Assessment of Acid Preventative Techniques Employed at the Island Creek Mining Co. Ten Mill Site" Apr. 3, 1991.

*Primary Examiner*—Shrive Beck
*Assistant Examiner*—David Maiorana
*Attorney, Agent, or Firm*—King and Schickli

[57] ABSTRACT

The present method induces an oxidation-proof ferric phosphate coating on iron sulfide such as pyrite and marcasite. The method includes the steps of placing the pyrite to be treated in a reaction vessel and leaching the pyrite with a coating composition including water, an oxidizing agent and a phosphate coating agent. Examples of oxidizing agents include hydrogen peroxide, sodium hypochlorite, potassium hypochlorite and mixtures thereof. The phosphate coating agent may be potassium dihydrogen phosphate. In order to ensure the formation of the stable coating, the leaching is performed at a pH of substantially 5 and at a temperature of substantially 40° C. Additionally, the oxidizing agent is maintained at a concentration of substantially 0.1% by weight of the coating composition while the concentration of the phosphate coating agent is maintained at at least substantially $10^{-4}$ M/l.

22 Claims, 2 Drawing Sheets

H₂O₂ INDUCED OXIDATION PROOF PHOSPHATE SURFACE COATING ON IRON SULFIDES

This invention was made with government support under contract no. J0290004 awarded by the United States Department of the Interior, Bureau of Mines. The government has certain rights in the invention.

TECHNICAL FIELD

The present invention relates generally to the control of acid drainage and more particularly to a method for reducing or preventing the oxygen and water oxidation of pyrite and marcasite waste products of the mining and ore purification industries and the resulting production of acid solutions enriched with heavy metals that pollute the environment.

BACKGROUND OF THE INVENTION

In recent years, the public, industry and government at all levels have become acutely aware of the need to manage the nation's water resources more efficiently. Further, society is now demanding that cleaner streams, rivers and lakes be provided free from pollutants that might interfere with the best use of these resources. Accordingly, many new laws have been passed that prohibit the discharge of water into streams unless or until it is free from certain pollutants. As a result mine water or mine drainage is one of the more serious environmental problems facing the coal industry today. This is particularly true as it relates to long established underground operations (Crickmer, Douglas F., Zegeer, David A., *Elements of Practical Coal Mining*, The Society of Mining Engineers of the American Institute of Mining, Metallurgical and Petroleum Engineers, Inc., New York, N.Y., 1981, pp. 669-672).

More specifically, mining operations for coal and various ores involve the in situ exposure of pyrite and marcasite containing geologic strata to the atmosphere. These iron sulfide compounds undergo oxidation upon contact with the oxygen and water that is plentiful in the environment. This oxidation produces highly acid water enriched with various heavy metals.

In addition to pyrite and marcasite present in the geologic strata, pyrite and marcasite is often a component of the mined ore product. Upon further treatment of the ore for product purification purposes this additional pyrite and marcasite is separated and treated as a waste product. This waste product is subject to oxidation as described above and consequently also produces acid solutions enriched with heavy metals. As already indicated, both the acid solutions and heavy metals are now recognized as very significant environmental pollutants that must be controlled. Up until the development of the present invention, however, there has been no reliable, long term, economic technique to reduce or prevent the oxidation of the pyrite and marcasite.

To date, there have been three approaches utilized to treat pyrite/marcasite rich material in order to control oxidation. In the first approach, neutralizing agents are utilized to treat acid drainages produced from the oxidation. Unfortunately, this approach only treats the symptoms of the oxidation and simply does not address the cause. Further, the approach is very costly. Additionally, it only represents a short term solution as it is not feasible to periodically return to the site to retreat the drainages over an extended period of time.

The second approach involves the utilization of detergents to kill sulfur oxidizing bacteria. Unfortunately, this approach is also only a relatively short term solution lasting from six months to a year. Further, it is also only suited to certain field conditions and thus has limited applications. Still further, utilization of some of the detergents also effects the environment adversely and accordingly, the impact of this procedure must be closely monitored.

The third and final approach commonly utilized is physical encapsulation of the pyrite/marcasite containing waste products. More particularly, clay liners, plastic liners and blacktop liners may be utilized to prevent oxygen and water from reaching the pyrite and marcasite. Unfortunately, this approach is very expensive. Additionally, the liners are subject to cracking and the cost to repair cracked liners is prohibitive. Accordingly, this approach is rarely used by mine operators.

A fourth approach is proposed in Flynn U.S. Pat. No. 3,443,882. In this patent earth strata; rocks, mine tailings, gob piles and the like are treated to prevent oxidation of iron sulfide compounds such as pyrite and marcasite. More specifically, Flynn teaches the application of a phosphate coating on the pyrite and marcasite by mixing the materials with an inorganic phosphate such as naturally occurring calcium phosphate. This phosphate is disclosed as gradually converting the iron sulfide ($FeS_2$) to calcium sulfate ($CaSO_4$), and vivianite ($Fe_3(PO_4)_2$).

Experiments have, however, unfortunately shown that if one applies calcium phosphate to pyrite/marcasite in nature, the calcium phosphate actually becomes coated through a well-known reaction called metal surface adsorption. More specifically, as the pyrite and marcasite are oxidized through contact with oxygen and water, ferrous sulfate ($FeSO_4$) is generated. This is a very soluble salt that rapidly coats the pulverized calcium phosphate rendering it inactive. Accordingly, it has been found that the metal surface adsorption not only prevents the production of vivianite as suggested by Flynn but it also makes the Flynn approach inoperative.

In an effort to avoid the coating of the phosphate itself, Flynn recommends in the patent the application of sulfuric acid. However, it should be appreciated that sulfuric acid causes very significant damage to ground water supplies by dissolving more heavy metals. Accordingly, this proposed solution to the problem is simply environmentally unacceptable. Additionally, the Flynn patent suggests the utilization of chlorine or bromine gas to kill the sulfur oxidizing bacteria. At best, such a procedure would only be effective for a few months before additional treatments would be required. Furthermore, it is unlikely that the utilization of such highly toxic gasses as chlorine or bromine would ever be approved by the government. As a result of these and other shortcomings, the approach proposed by Flynn has not been put into practice.

Following review of this background to the pyrite and marcasite oxidation problem, it should be appreciated that a need exists for a better solution. Further, the need is great. So as to have a better understanding of the extent of the problem, an average coal processing plant produces anywhere from 1 to 5 tons of finely ground pyrite per hour. Thus, this is a very significant environmental problem.

SUMMARY OF THE INVENTION

Accordingly, it is a primary object of the present invention to provide a method for treating iron sulfide containing material in order to control oxidation and the production of acid solutions enriched with heavy metals overcoming the above-described limitations and disadvantages of the prior art.

Another object of the present invention is to provide a method of inducing an oxidation-proof phosphate surface coating on pyrite and marcasite wherein the coating is stable and long lasting thereby significantly reducing or eliminating this environmental problem.

Yet another object of the preset invention is to provide a relatively economical and efficient method for treating mine tailings and waste products from ore purification processes so as to reduce or substantially eliminate the oxidation of iron sulfides such as pyrite and marcasite contained in those waste products. Advantageously, as the resulting phosphate coating is stable and long lasting, these waste products may then be safely disposed of in the environment without the need for expensive physical encapsulation processes including the construction of clay, plastic or blacktop liners. This is because the phosphate coating substantially prevents the contact of oxygen and water with the pyrite/marcasite. Thus, the production of acid solutions enriched with heavy metals from oxidation of iron sulfides is substantially eliminated.

Still another object of the invention is to provide a method of coating iron sulfides such as pyrite and marcasite in situ to minimize environmental damage from oxidation and reduce the chances of spontaneous combustion of coal reserves resulting from heat produced during flamboidal pyrite oxidation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a method of inducing an oxidation-proof phosphate coating on iron sulfide materials such as pyrite and marcasite is provided. In accordance with the broader aspects of the present invention, the method includes the step of placing the iron sulfide containing material to be treated in a reaction vessel. Next is the step of leaching the material with a coating composition or solution including water, an oxidizing agent and a phosphate coating agent. This coating composition is preferably buffered to a pH between substantially 5–7. It is also important to maintain the phosphate coating composition at a temperature of between substantially 25°–40° C. during the leaching process. Both the pH range and temperature range must be maintained in order to ensure the establishment of an actual phosphate coating on the pyrite and marcasite for long term, reliable protection from oxidation and the resulting acid solutions enriched with heavy metals produced thereby.

More specifically, the oxidizing agent is selected from a group of compounds including hydrogen peroxide ($H_2O_2$), sodium hypochlorite (NaClO), potassium hypochlorite (KClO), and mixtures thereof. Further, the coating composition includes substantially 0.1% by weight oxidizing agent. The optimal concentration of oxidizing agent is related to the phosphate concentration in the coating composition.

Preferably, the phosphate coating agent is potassium dihydrogen phosphate ($KH_2PO_4$). It should be appreciated, however, that other water soluble phosphate compounds such as sodium dihydrogen phosphate ($NaH_2PO_4$) may be utilized. Dibasic and tribasic phosphate salts are not suitable, however, as solutions of these salts are alkaline and will precipitate the iron as $Fe(OH)_3$ and coating will not take place.

In order to ensure economic and efficient coating, the concentration of phosphate in the coating composition should be maintained at at least substantially $10^{-4}$ M/l and more preferably $10^{-3}$ M/l. At this concentration, the phosphate inhibits any dissolution of the coating that might otherwise take place as a result of the activity of the strong acid produced by the reaction between the oxidizing agent and exposed pyritic surfaces during processing.

For more efficient processing, it is desirable to create a slurry of water and the pyrite containing material. This slurry is then placed in the reaction vessel. The reaction vessel is then filled from the bottom up with the coating composition at a flow rate of, for example, substantially 0.5 milliliters per minute per square centimeter of the bottom surface area of the reaction vessel. The leaching treatment continues for a period of time of from 30–60 minutes in order to provide the desired coating action. Of course, it should be appreciated that the coating composition may be recycled as all the phosphate coating agent is not removed from the coating composition after a single pass through the reaction vessel. Preferably, when recycling the phosphate coating agent concentration is brought back to at least $10^{-4}$ M/l and more preferably $10^{-3}$ M/l prior to returning to the reaction vessel.

As will be described in greater detail below, the present method serves to form a stable and durable coating over the iron sulfide materials including pyrite and marcasite contained in mine tailings and waste products from ore purification processes. This coating advantageously resists penetration by oxygen and water thereby preventing contact between the iron sulfide of the pyrite and marcasite and these oxidation agents.

In accordance with yet another aspect of the present invention, the life of the coating may be enhanced in the environment by mixing the coated pyrite/marcasite with limestone prior to disposition in a landfill. Advantageously, the limestone functions to protect the coating from acid attack. As a result of the present invention, a long lasting and reliable coating is provided that effectively allows iron sulfide materials such as pyrite and marcasite to be reintroduced into the environment while significantly reducing or substantially eliminating the potential adverse environmental effects that would otherwise be produced through oxidation: that is the production of acid solutions significantly enriched with heavy metals.

In accordance with still another aspect of the present invention, a phosphate coating is provided on iron sulfide including pyrite and marcasite in situ. Specifically, a coating composition of the type described including water, an oxidizing agent and a phosphate coating agent is applied to the iron sulfide containing material. As a result, a phosphate coating is produced that prevents oxidation, thereby reducing the adverse environmental effects that would otherwise occur.

Additionally, the coating process also reduces the risk of framboidal pyrite oxidation induced fires. More specifically, it has been found that under certain conditions, oxidation of framboidal pyrite produces sufficient heat to cause coal in adjacent strata to combust spontaneously. By reducing the risk of such a fire occurring, damage to the environment is further limited and coal reserves are saved.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
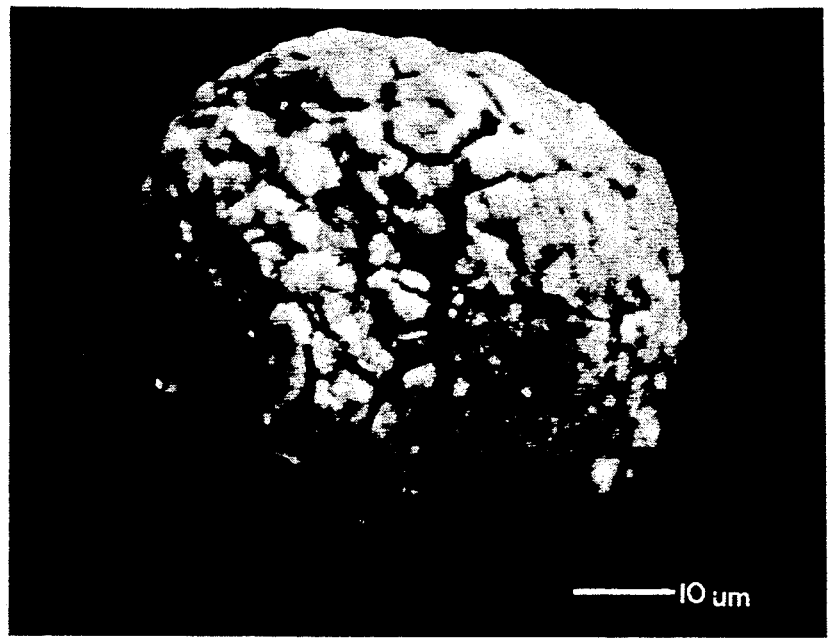
FIG. 1 is a scanning electron microscope black and white photograph of a framboidal pyrite particle with a FePO$_4$ coating as a result of undergoing processing in accordance with the method of the present invention.

Reference will now be made in detail to the present preferred embodiment of the invention resulting in the phosphate coating of pyrite as illustrated in the accompanying photographs.

DETAILED DESCRIPTION OF THE INVENTION

As indicated above, the present method induces an oxidation-proof phosphate surface coating on iron sulfide materials such as pyrite and marcasite. Such iron sulfides may be found in earth strata, rocks, mine tailings, gob piles, waste products from ore purification processes and the like. Unfortunately, the safe environmental disposal of these materials is difficult as oxygen and water in the environment oxidize the iron sulfides and produce strong sulfuric acid solutions that are enriched with heavy metals. Advantageously, the present invention efficiently and effectively addresses this problem by providing a stable and long lasting coating over the pyrite and marcasite that prevents the oxidation reaction from occurring.

More specifically, the present invention involves leaching the iron sulfide containing material with a coating composition including water, an oxidizing agent and a phosphate coating agent. When the coating composition comes into contact with the surface of the iron sulfide containing material under the defined conditions, the following reactions occur leading to the formation of a surface coating.

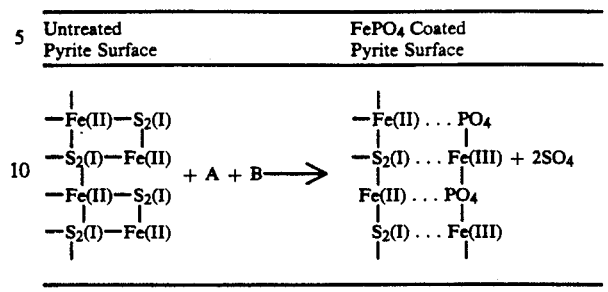

A = oxidizing agent
B = phosphate coating agent

More specifically, the surface of the pyrite or marcasite upon exposure to an oxidizing agent such as hydrogen peroxide, sodium hypochlorite, potassium hypochlorite or mixtures thereof undergoes oxidation. Specifically, the Fe(II) oxidizes to Fe(III) and the sulfide (S$_2$) oxidizes to SO$_4^{-2}$. The latter is soluble species. Advantageously, the iron (Fe(III)) reacts with the PO$_4^{-3}$ provided by the phosphate coating agent thereby forming highly acid-resistant ferric phosphate (FePO$_4$). This ferric phosphate coating prevents any further oxidation of the pyrite as shown in the above chemical equation, the dotted lines signifying physical bonding between the pyrite and the ferric phosphate coating.

More particularly describing the method, the iron sulfide containing material to be treated is mixed with an appropriate volume of water in order to form a slurry. The slurry is then pumped or placed in a reaction vessel of desired size. The vessel volume would depend upon the size of the operation but one of 30.0 ft$^3$ capacity is feasible.

The reaction vessel is preferably fitted with mechanical agitators and a solution tight cover in the same manner as froth flotation apparatus known in the art. After the slurry is placed in the reaction vessel and the cover sealed, the agitator is activated and leaching of the iron sulfide materials, e.g., pyrite and marcasite, is initiated with a coating composition including water, an oxidizing agent and a phosphate coating agent. Preferably, the oxidizing agent is selected from a group of compounds including hydrogen peroxide, sodium hypochlorite, potassium hypochlorite, and mixtures thereof. The phosphate coating agent is preferably potassium dihydrogen phosphate, sodium dihydrogen phosphate or mixtures thereof. It should be recognized, however, that most any soluble phosphate compound may be used. It is suggested, however, that dibasic and tribasic phosphate salts not be used as these salts are alkaline and will precipitate iron as Fe(OH)$_3$ rather than form a coating.

In order to ensure the formation of a ferric phosphate coating on the pyrite/marcasite, reaction conditions must be strictly maintained. In particular, the coating composition is preferably buffered to a pH between substantially 5-7. A number of known buffering agents may be utilized for this purpose including, for example, sodium acetate (C$_2$H$_3$NaO$_2$). Specifically, the pH must be maintained higher than substantially 5 in order to induce formation of an iron phosphate coating. Too high a pH, however, causes hydroxyl groups to become competitive in the reaction. This leads to the formation of iron hydroxide rather than the desired iron phosphate. Hence at a pH above substantially 7, a hydroxyl iron phosphate coating results that is more soluble and less resistant to acid attacked and thus, less desirable.

In addition, it is important to maintain the temperature of the phosphate coating composition during leaching between substantially 25°–40° C. The amount of the oxidizing agent is also maintained at a specific level of substantially 0.1% by weight of the coating composition. The actual concentration of the oxidizing agent is varied with the phosphate concentration of the coating composition as presented in the slurry. For example, for $10^{-2}$M $KH_2PO_4$, optimal $H_2O_2$ concentrations range from 0.015–0.035M. Further, it is important to maintain the concentration of the phosphate in the phosphate coating composition and slurry in the reaction vessel at a level of at least $10^{-4}$ M/l and more preferably $10^{-3}$ M/l during leaching. This is necessary to insure that the coating does not collapse from dissolution of the $FePO_4$ by the strong acid produced during the initial stages of the process as a result of oxidation of exposed pyritic surfaces by the oxidizing agent.

Advantageously, by maintaining all these parameters, a ferric phosphate coating is formed on the pyrite/marcasite to thereby provide long lasting protection against oxidation upon return of the pyrite/marcasite to the environment.

In order to ensure that all of the pyrite/marcasite in the reaction vessel is completely coated, it is desirable to pump the coating composition into the reaction vessel from the bottom so that it flows up through the vessel and out a return conduit. Preferably, a flow rate of, for example, substantially 0.5 milliliters per minute per square centimeter of the bottom surface area of the bottom reaction vessel is used. Of course, as all of the phosphate coating agent is not utilized in creating a coating as it cycles through the vessel, the coating composition is preferably recycled. During recycling, the composition is monitored and oxidizing agent and phosphate coating agent may be added as required to maintain the necessary concentration levels before returning to the reaction vessel. It has been found that by performing the leaching operation as described for a period of 30 to 60 minutes, all the pyrite may be reliably coated with the stable ferric phosphate coating.

After coating the pyrite/marcasite with ferric phosphate in the manner described, environmentally acceptable disposal of this waste product is more possible. Specifically, for as long as the coating remains sound, oxidation of the pyrite/marcasite by atmospheric oxygen and water is substantially prevented. As a result, the acid drainage and heavy metal pollution problems are virtually eliminated.

In accordance with still another aspect of the present invention, the integrity and durability of the phosphate coating may also be enhanced by mixing the coated pyrite/marcasite with finely ground limestone prior to being disposed of in a properly designed landfill. For example, approximately 3–7 and preferably 5 kg of limestone may be mixed with each ton of coated pyrite/marcasite. Advantageously, the limestone serves to protect the coating from acid attack in the environment thereby extending the operative life of the coating and further protecting the pyrite/marcasite from oxidation.

Of course, it should be appreciated that iron sulfide containing materials such as pyrite and marcasite may also be coated by the present method in situ. More specifically, this is done by applying to the pyrite/marcasite containing strata an effective amount of the coating composition described including water, an oxidizing agent and a phosphate coating agent. Any runoff of coating composition may be collected in a run off pond and recycled.

Advantageously, the resulting coating of the pyrite/marcasite in situ reduces or prevents the oxidation process from occurring thereby reducing or preventing the production of acid solutions enriched with heavy metals. Additionally, the oxidation of flamboidal pyrite has been known to produce sufficient heat to cause coal to combust spontaneously. The risk of this very significant problem occurring is substantially reduced utilizing the present method.

The following example is presented to further illustrate the invention, but it is not to be considered as limited thereto.

EXAMPLE 50 mg of 100 mesh pure pyrite (coal shale pyrite) was mixed with 500 mg of sand previously passed through a 140 mesh sieve. After thorough mixing, the mixture was placed into a reaction vessel or column having a 1 cm inside diameter. After placement in the column the mixture was pressed into a disc. The column was then leached with 500 ml of a solution containing 0.1% hydrogen peroxide and $10^{-3}$ moles/liter potassium dihydrogen phosphate (e.g. 3.2 mg/l phosphorus) maintained at 40° C. using a pump at a flow rate of 0.5 milliliters per minute. The coating solution was also buffered with sodium acetate at pH 5.

Figure 2:
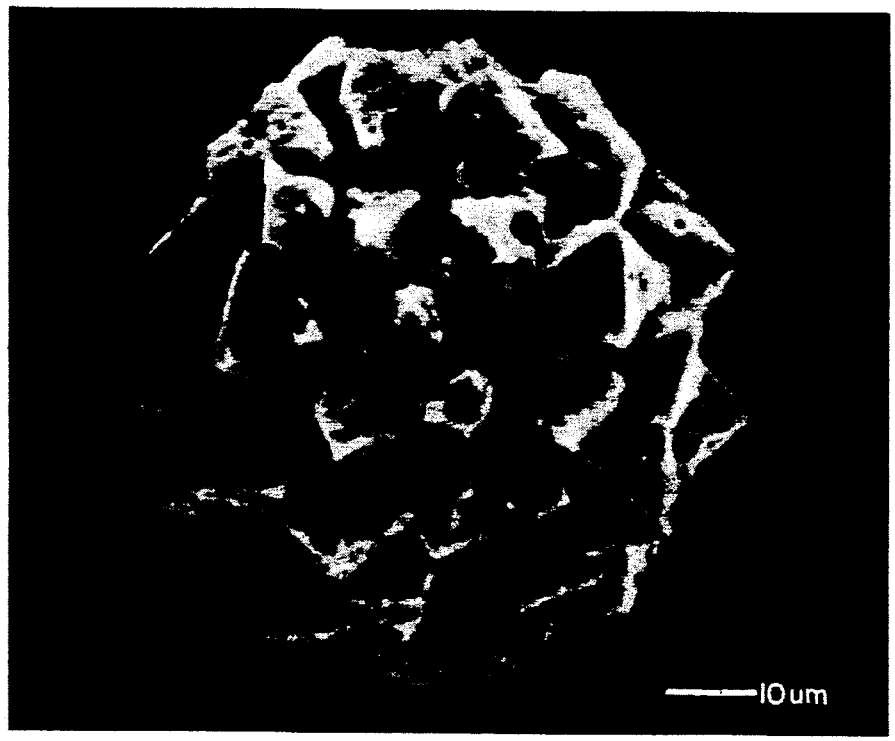
FIG. 2 is a scanning electron microscope black and white photograph showing the morphology of a framboidal pyrite particle prior to undergoing processing in accordance with the present method and therefore not including the phosphate coating shown in FIG. 1.
Figure 3:
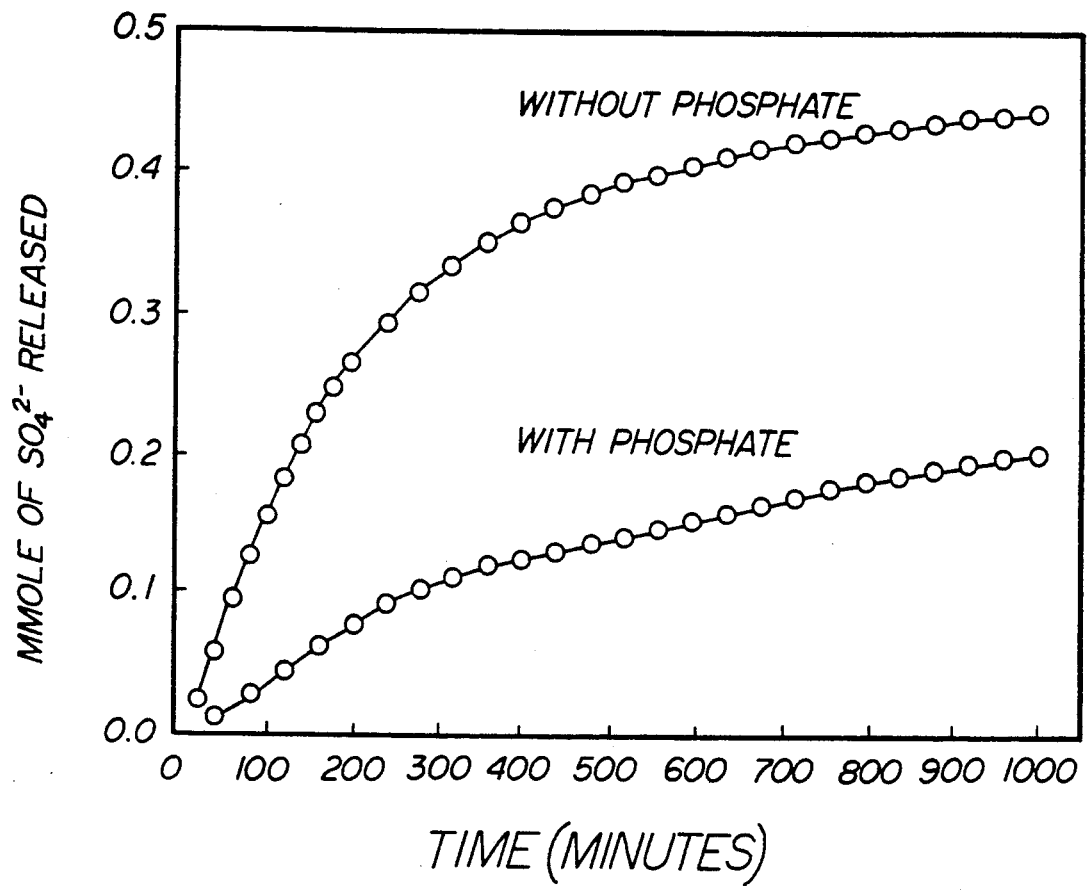
FIG. 3 is a graphical representation showing the oxidation of pyrite in the absence or presence of phosphate.

Physical evidence of the formation of a ferric phosphate coating on the pyrite is presented in the electron microscope photos shown in FIGS. 1 and 2. FIG. 1 shows the surface appearance of the coated pyrite while FIG. 2 shows the surface appearance of the uncoated pyrite. The role of the ferric phosphate coating on pyrite oxidation is best demonstrated in FIG. 3. In particular, note the difference in the release of $SO_4^{2-}$ from the coated and uncoated pyrite. In particular the release of $SO_4^{2-}$ from coated pyrite at the beginning of the reaction signifies the formation of the coating. As time passes, the coating increases in thickness and the release of $SO_4^{2-}$ is diminished.

In summary, numerous benefits result from employing the concepts of the present invention. More particularly, an economical and effective method for preventing oxidation of iron sulfides including pyrite and marcasite, as a result of reaction with oxygen and water in the environment is provided. As a result, these compounds may be disposed of in a more environmentally safe manner. In particular, a strong and stable ferric phosphate coating is provided on the pyrite/marcasite. This coating shields the pyrite/marcasite from contact with the oxidizing agents in the environment that would otherwise lead to the formation of acid solutions enriched with heavy metals. As a result of the present method, a very significant cause of environmental problems has been addressed in a more effective manner than possible in prior art approaches. Accordingly, the present invention represents a significant advance in the art of controlling this type of environmental pollution.

We claim:

1. A method of inducing an oxidation proof phosphate surface coating on iron sulfide containing materials including pyrite and marcasite, comprising the steps of:

placing the iron sulfide containing materials in a reaction vessel;

leaching the iron sulfide containing materials with a phosphate coating composition including water, an oxidizing agent and a phosphate coating agent buffered to a pH of between substantially 5-7;

maintaining said phosphate coating composition at a temperature of substantially 25°-40° C. during leaching.

2. The method set forth in claim 1, wherein said phosphate coating agent is selected from a group consisting of potassium dihydrogen phosphate, sodium dihydrogen phosphate and mixtures thereof.

3. The method set forth in claim 1 including first forming a slurry with said iron sulfide containing materials prior to placing into said reaction vessel.

4. The method set forth in claim 1, including selecting said oxidizing agent from a group consisting of hydrogen peroxide, sodium hypochlorite, potassium hypochlorite and mixtures thereof.

5. The method set forth in claim 4, including providing said phosphate coating composition with substantially 0.1% by weight oxidizing agent.

6. The method set forth in claim 1, including providing said phosphate coating composition with substantially 0.1% by weight oxidizing agent.

7. The method set forth in claim 2, including maintaining phosphate in said coating composition at a concentration of at least substantially $10^{-4}$ M/l.

8. The method set forth in claim 1, including pumping said coating composition into the reaction vessel from the bottom up at a flow rate of substantially 0.5 milliliters per minute per square centimeter of the bottom surface area of said reaction vessel.

9. The method set forth in claim 8, including continuing to leach said iron sulfide containing materials for a period of time of from 30 to 60 minutes.

10. The method set forth in claim 1, including recycling said coating composition and bringing said phosphate coating agent concentration back to at least $10^{-4}$ M/l prior to returning to said reaction vessel.

11. A method of inducing an oxidation proof phosphate surface coating on iron sulfide containing materials including pyrite and marcasite, comprising the steps of:

placing the iron sulfide containing materials in a reaction vessel;

leaching the iron sulfide containing materials with a phosphate coating composition including water, substantially 0.1% by weight oxidizing agent selected from a group consisting of hydrogen peroxide, sodium hypochlorite, potassium hypochlorite and mixtures thereof and a soluble phosphate coating agent buffered to a pH of substantially 5-7;

maintaining the concentration of phosphate in said phosphate coating composition at a level of at least $10^{-4}$ M/l during leaching; and maintaining the temperature of said phosphate coating composition at substantially 25°-40° C. during leaching whereby a phosphate coating is formed on said iron sulfide containing materials.

12. The method set forth in claim 11, including first forming a slurry with said iron sulfide containing materials prior to placing into said reaction vessel.

13. The method set forth in claim 12, including pumping said coating composition into the reaction vessel from the bottom up at a flow rate of substantially 0.5 milliliters per minute per square centimeter of the bottom surface area of said reaction vessel.

14. The method set forth in claim 11, including pumping said coating composition into the reaction vessel from the bottom up at a flow rate of substantially 0.5 milliliters per minute per square centimeter of the bottom surface area of said reaction vessel.

15. The method set forth in claim 14, including continuing to leach said iron sulfide containing materials for a period of time of from 30 to 60 minutes.

16. The method set forth in claim 11, including continuing to leach said iron sulfide containing materials for a period of time of from 30 to 60 minutes.

17. The method set forth in claim 15, including recycling said coating composition and bringing said phosphate concentration back to at least $10^{-4}$ M/l prior to returning to said reaction vessel.

18. The method set forth in claim 11, including recycling said coating composition and bringing said phosphate concentration back to at least $10^{-4}$ M/l prior to returning to said reaction vessel.

19. The method set forth in claim 11, including mixing coated iron sulfide containing materials with limestone prior to disposing of said coated iron sulfide containing materials in the environment.

20. The method set forth in claim 19, wherein between substantially 3 and 7 kg of limestone is mixed with each ton of coated iron sulfide containing materials.

21. A method of providing a phosphate coating on iron sulfide containing materials in situ, comprising the step of:

applying an effective amount of a phosphate coating composition including water, an oxidizing agent and a phosphate coating agent buffered to a pH of between substantially 5-7 to said iron sulfide containing material in situ.

22. The method set forth in claim 21 wherein said oxidizing agent is selected from a group consisting of hydrogen peroxide, sodium hypochlorite, potassium hypochlorite and mixtures thereof, said phosphate coating agent is selected from a group consisting of potassium dihydrogen phosphate, sodium dihydrogen phosphate and mixtures thereof and said application is completed at an ambient temperature above 25° C.

* * * * *